(No Model.)
F. P. LARKIN.
WATER CLOSET SEAT.
No. 426,287. Patented Apr. 22, 1890.
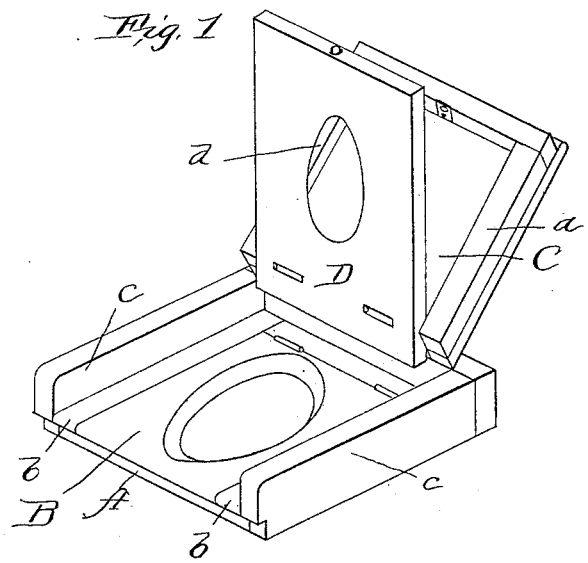
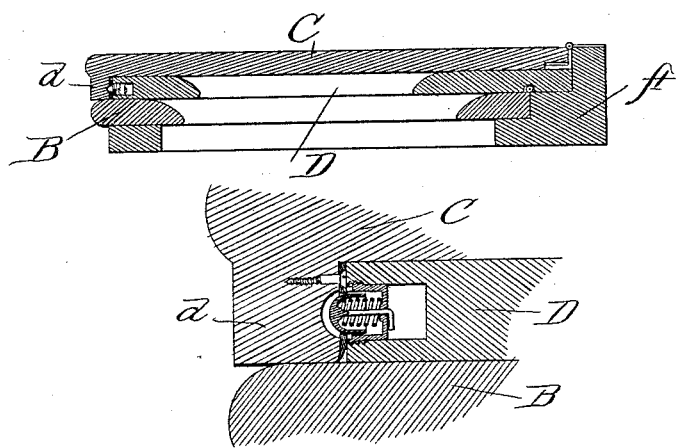
Witnesses
F. L. Middleton
W. T. Keene
Inventor.
Ferdinand P. Larkin
by Ellis Spear
Attorney.
THE NORRIS PETERS CO., PHOTO-LITHO., WASHINGTON, D. C.

UNITED STATES PATENT OFFICE.

FERDINAND P. LARKIN, OF WORCESTER, MASSACHUSETTS, ASSIGNOR OF ONE-HALF TO S. AUGUSTUS WELCH, OF SAME PLACE.

WATER-CLOSET SEAT.

SPECIFICATION forming part of Letters Patent No. 426,287, dated April 22, 1890.

Application filed August 26, 1889. Serial No. 322,003. (No model.)

*To all whom it may concern:*

Be it known that I, FERDINAND P. LARKIN, of Worcester, in the county of Worcester and State of Massachusetts, have invented a new and useful Improvement in Water-Closet Seats; and I do hereby declare that the following is a full, clear, and exact description of the same.

My invention is an improvement in the seats of water-closets, commodes, and the like. It is designed to render the seat adjustable to render it convenient for either adults or children. It is represented in the accompanying drawings, in which—

Figure 1 represents a perspective view of the top of a closet embodying my invention with the cover and top seat thrown back. Fig. 2 is a central vertical section through the seats and cover.

In the drawings, A represents the main frame or base. The rear part has a stepped or rabbeted inner face, as shown in Fig. 2. The seat B, having the larger opening, is hinged on its rear edge to rest on the lower step or ledge and on the plain margin of the frame on each side and on the front. This lower seat has the larger aperture. When down, the edges of the seat B are between ledges *b b* on each side, and the upper surface of this seat is flush with the upper surface of the ledges. Back of the line of hinges of the lower seat and on the higher ledge is hinged the upper seat D, which has the smaller aperture. This seat is made in width the same as the lower, and when down rests at the rear on the higher ledge and for the rest on the seat B. The apertures are arranged to register with each other, and when the upper seat is raised the closet is convenient for adults. It has a level upper surface in plane, and the side flanges *c c* and the upper seat with the cover form the back. The upper seat fits snugly between the flanges *c c*.

The cover C is hinged on the same line with the hinges of the upper seat and has flanges *d* on the sides and front, within which the upper seat, when raised and thrown, fits snugly, forming a complete back. The flanges of the cover are flush with the seat D when the seat and cover are in contact and the flanges shut down upon the ledges *b*.

I am aware that it is not new to provide a water-closet seat with a variable opening, and I do not broadly claim this as my invention.

I claim as my invention—

1. In combination with the base having on its rear part rabbets or ledges, a seat having a larger aperture hinged on the lower ledge and arranged to rest on the base, and an upper seat having a smaller aperture arranged to rest on the lower seat, said upper seat being hinged to the rear of the lower and on a higher ledge, all substantially as described.

2. In combination with the base having on its rear part rabbets or ledges, a seat having a larger aperture hinged on the lower ledge and arranged to rest on the base, an upper seat having a smaller aperture arranged to rest on the lower seat, said upper seat being hinged to the rear of the lower and on a higher ledge, and a cover having flanges *d* fitted to the upper seat, substantially as described.

In testimony whereof I have signed my name to this specification in the presence of two subscribing witnesses.

FERDINAND P. LARKIN.

Witnesses:
C. H. WELCH,
KATE H. WELCH.